United States Patent [19]

Carlin

[11] 4,335,679
[45] Jun. 22, 1982

[54] FELINE CAGE PLATFORM

[76] Inventor: Milton O. Carlin, 13111 E. 11th St., Tulsa, Okla. 74108

[21] Appl. No.: 260,098

[22] Filed: May 4, 1981

[51] Int. Cl.³ ............................................. A01K 29/00
[52] U.S. Cl. ..................................... 119/1; 119/51.5; 119/51 R
[58] Field of Search .................... 119/1, 17, 19, 51.5, 119/51 R

[56] References Cited

U.S. PATENT DOCUMENTS

| | | | |
|---|---|---|---|
| D. 258,018 | 1/1981 | Venditto et al. | 119/51.5 |
| D. 259,144 | 3/1981 | Carlin | D30/2 |
| 1,754,763 | 1/1930 | Nunnally | 122/223 |
| 2,554,086 | 5/1951 | Block | 119/51.5 |
| 2,659,345 | 11/1953 | Herbert | 119/51 R |
| 2,914,022 | 11/1959 | Hinton | 119/17 |
| 3,292,582 | 12/1966 | Rubricius | 119/17 |
| 3,405,685 | 10/1968 | Harrell | 119/51 R |
| 3,990,396 | 11/1976 | Turk | 119/1 |
| 4,112,871 | 9/1978 | Newman | 119/18 |
| 4,257,349 | 3/1981 | Carlin | 119/1 |
| 4,261,294 | 4/1981 | Bescherer | 119/51 R |

FOREIGN PATENT DOCUMENTS 87157 4/1920 Switzerland ........................ 219/217

OTHER PUBLICATIONS

Page from undated catalog of "Cage Warmer", Mfg.: Edgewood.
List of References cited in Carlin Design Patent D. 259,144, dated 5/5/81.

Primary Examiner—Robert A. Hafer
Attorney, Agent, or Firm—Head & Johnson

[57] ABSTRACT

A feline cage platform having a rectangular frame with sidewalls, end walls and top surface, the bottom edges of the walls being in a common plane forming a base on which the frame rests with the top surface having recess means for accepting and securely holding removable food and water bowls and mini-litter pan, wherein the mini-litter pan includes a means to prevent scattering of litter and a means for collecting a urine sample. Such a device is useful for total care of a hospitalized feline patient.

4 Claims, 5 Drawing Figures

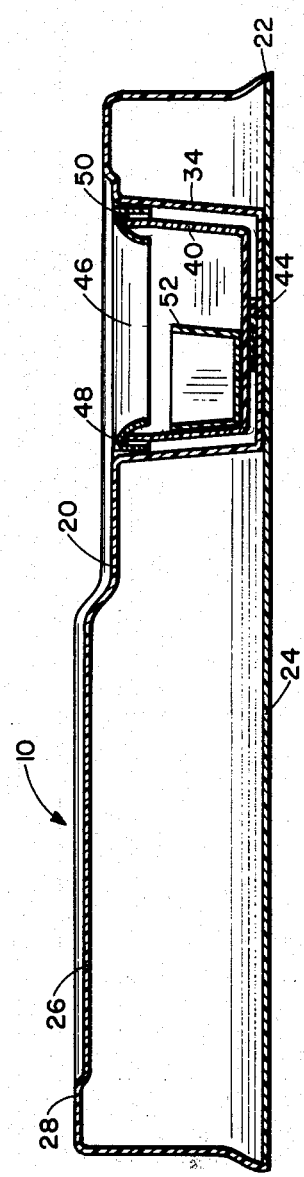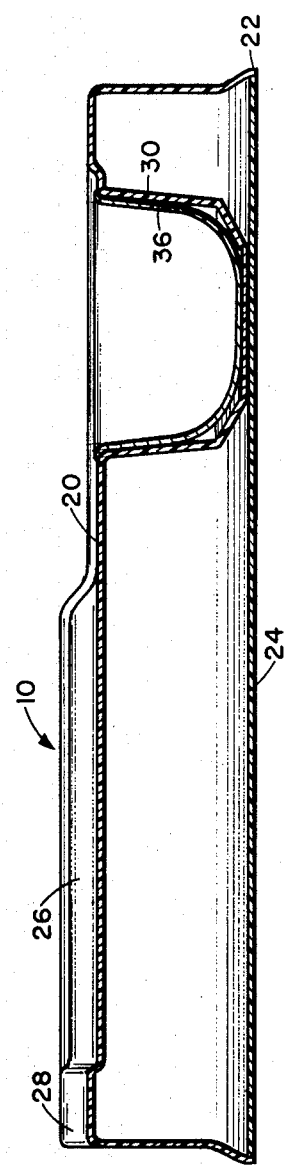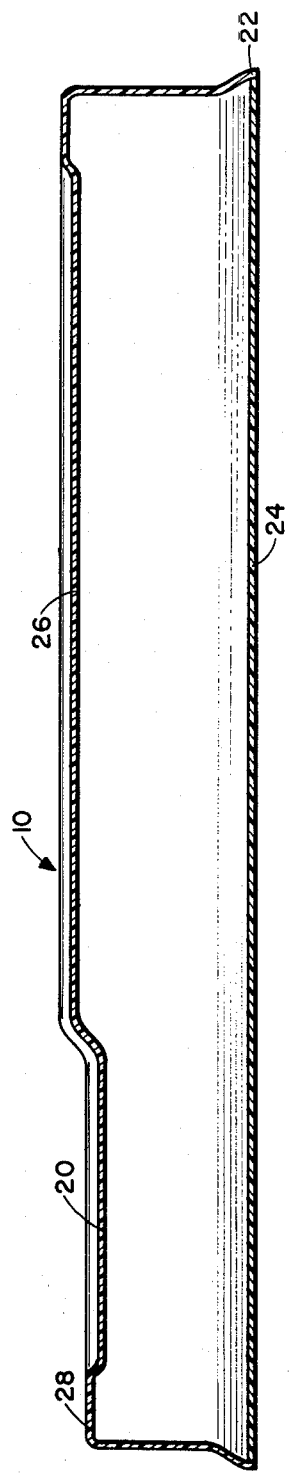

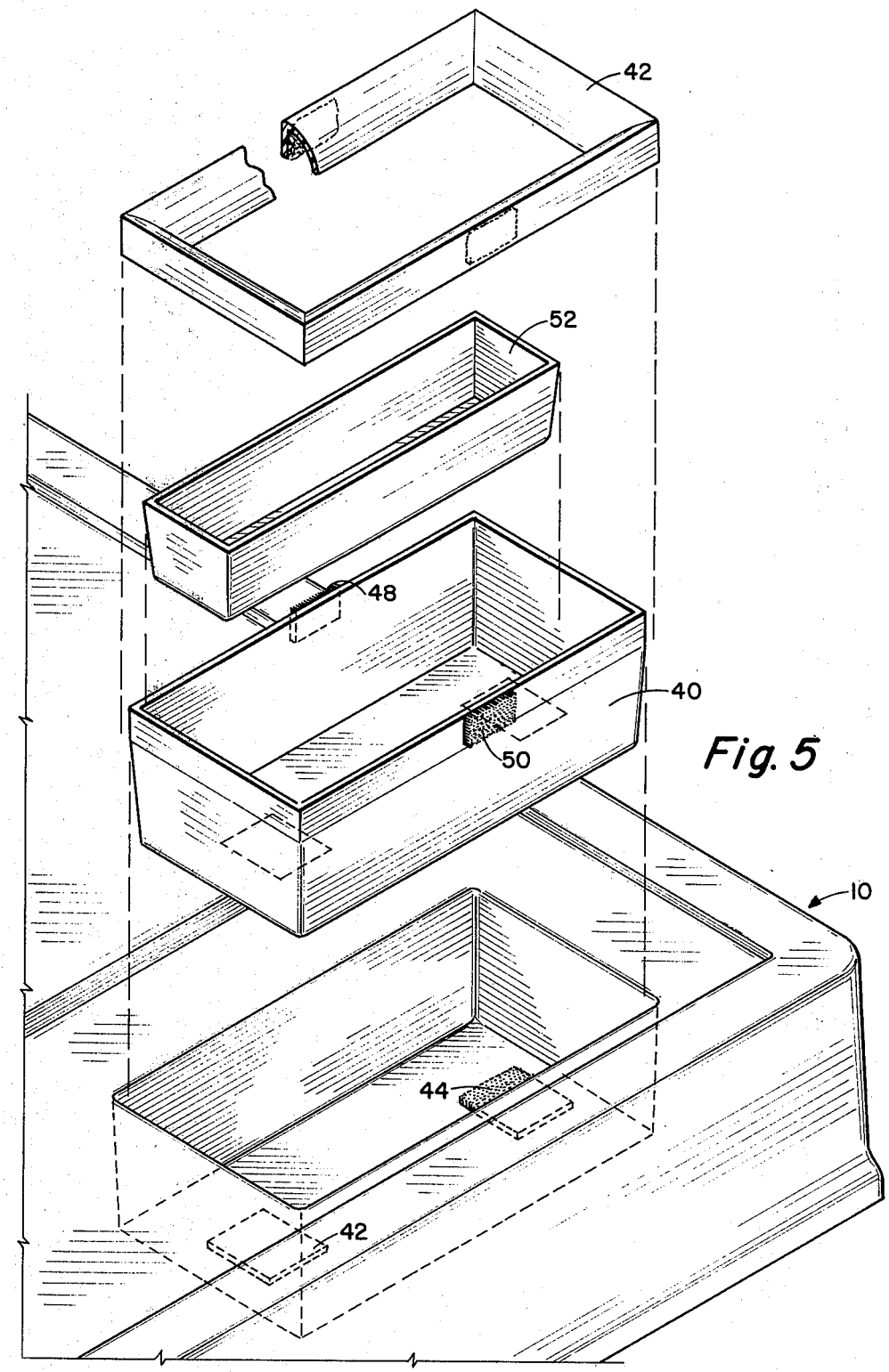

FELINE CAGE PLATFORM

BACKGROUND OF THE INVENTION

1. Field of the Invention

The present invention relates to a device for use in a cage in which a domesticated cat is placed for confinement, recovery from illness, medical or scientific observation and the like. More specifically, it deals with an apparatus for maintaining the cat in an environment that is conducive to rapid recovery and good health.

2. Description of the Prior Art

Because of certain desirable and inbred or hereditary behavior traits associated with the domestic cat (Felis catus), a confined or caged cat is particularly amenable to existing and being cared for in an environment conducive to cleanliness, rapid recovery from illness, and general good health. These unique characteristics have made the house cat a particularly attractive domesticated pet and have unfortunately been generally ignored in developing optimum methods and apparatus in caring for cats during confinement.

Thus, the traditional methods and apparatus commonly used in caring for small animals frequently create problems which are not necessary when dealing with the Felis catus. For example, the use of newspaper to line the bottom of the cage results in undesirable animal contact with newsprint ink. The presence of food and water in the cage with the animal generally results in spillage, uncleanliness of the cage, and even commingling and animal contact with its own excrement and the like. All of these problems, because of the behavior traits of the domestic cat, can be minimized.

SUMMARY OF THE INVENTION

In view of the shortcomings in the previous methods and apparatus, I have discovered an improved platform for supporting a confined domestic cat which lends itself to the total care of the hospitalized feline patient comprising:

(a) a frame having a top with downwardly depending sidewall structure circumferentially attached to the periphery of the top wherein the sidewall structure terminates at a lower edge forming a base to support the frame;

(b) recess means in the top for holding removable food and water bowls and a removable mini-litter pan; and (c) a mini-litter pan having a means for collecting a urine sample.

The present invention provides for a means to prevent scattering of litter which in one embodiment is a removably fastened top lip to the mini-litter pan. This mini-litter pan being an open-topped, closed-bottom container with essentially vertical sidewalls sized to fit within the recess holding means of the frame. In this embodiment, the top lip extends outward and downward into the interior of the mini-litter pan terminating above the desired level of the litter absorbent, thus preventing unwanted scattering of the litter and feces. The means for collecting the urine sample is an open-topped, closed-bottom container dimensioned to rest within the mini-litter pan with sidewalls that extend above the desired level of the absorbent and below the lip for preventing scattering of the litter. This lip can be removably fastened to the mini-litter pan and the mini-litter pan can be removably fastened to the frame by use of velcro ® fasteners and the like. The present invention further provides for a raised portion of the top, dimensioned for receiving a Felis catus, to serve as a platform and an integral raised lip around the periphery of the frame top.

A primary object of the present invention is to provide a platform to be inserted within a cage for confinement of small pet cats which accounts for the total care of the cat during confinement. An additional object is to provide for a means to receive a urine sample during the confinement. Fulfillment of these objects as well as the presence of other objects will be obvious upon reading of the complete specifications and claims taken in conjunction with the attached drawings.

BRIEF DESCRIPTION OF THE DRAWINGS

FIG. 2 is a cross-sectional view taken along the line 2—2 of FIG. 1.

FIG. 3 is a cross-sectional view taken along the line 3—3 of FIG. 1.

FIG. 4 is a cross-sectional view taken along the line 4—4 of FIG. 1.

FIG. 5 is a composite view of the platform.

DETAILED DESCRIPTION OF THE PREFERRED EMBODIMENTS

Figure 1:
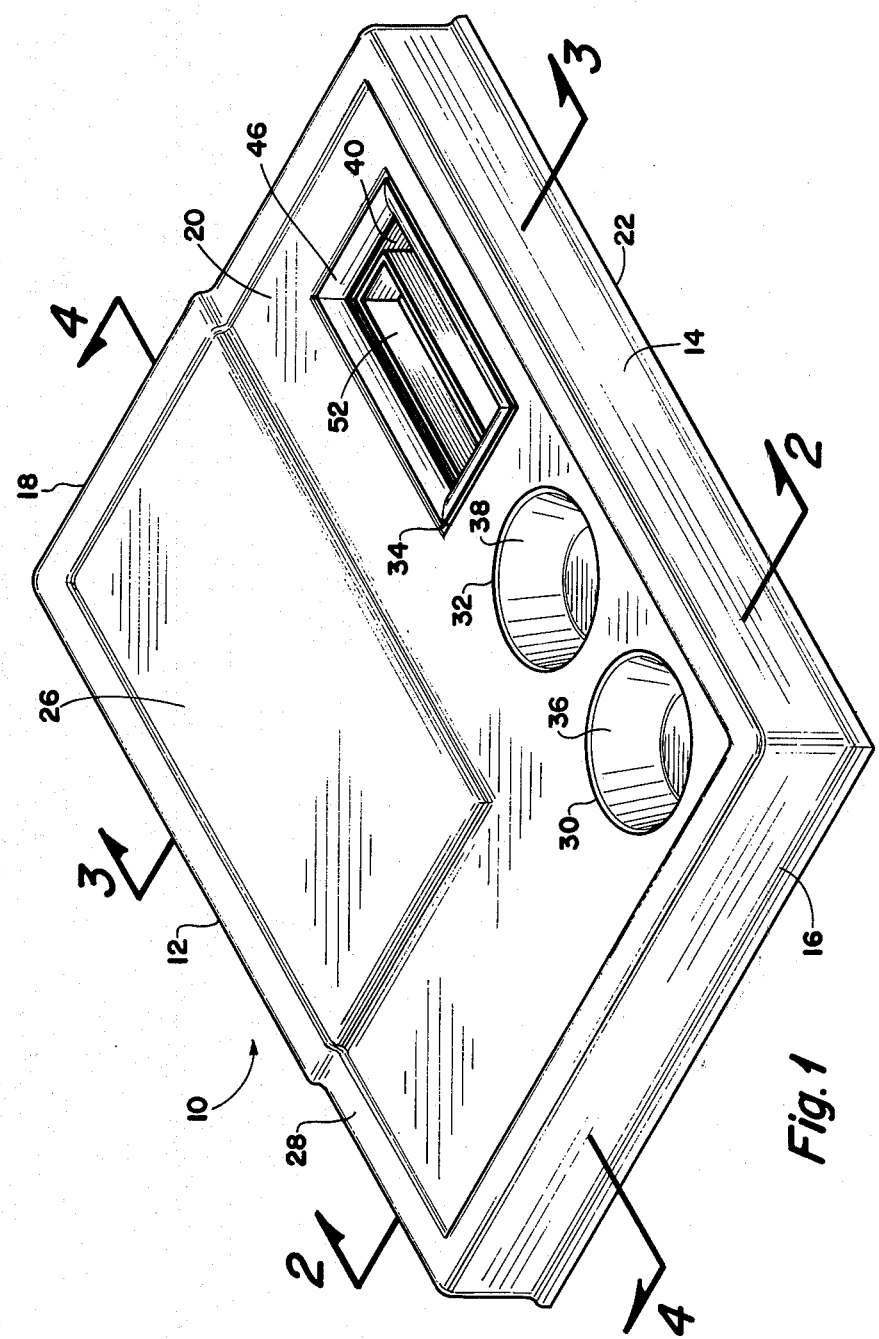
FIG. 1 is an isometric view of a platform for supporting a confined domestic cat according to this invention.

Referring to the drawings, first in FIG. 1, the feline cage platform is generally indicated by numeral 10. The platform is in the form of a rectangular frame having downwardly depending sidewalls 12 and 14, and end walls 16 and 18. The frame has a planar top 20. The lower edges of sidewalls 12 and 14, and end walls 16 and 18 terminate in a common plane and form a base 22 on which the frame is supported. An optional planar bottom surface 24 can be provided as illustrated in FIGS. 2, 3, and 4 for additional support and rigidity. The frame structure is preferably hollow so that the top 20 is spaced above base 22.

In a preferred embodiment, as illustrated, a portion of the top 20, dimensioned to receive a domestic cat, is raised, thus forming a plateau or surface 26. The periphery of the top 20 is also raised to provide a ridge 28 around the full perimeter. The top 20 is further provided with recesses 30, 32, and 34 for holding removable food and water bowls 36 and 38, and removable mini-litter pan 40.

Except for the removable food and water bowls 36 and 38 and removable mini-litter pan 40, the frame is integrally formed of all elements thus far enumerated and is preferably of an impervious material such as metal, plastics, thermoplastics, or fiber reinforced theremoplastics, surface coated paper products, and the like. Theremoplastics and fiberglass reinforced plastics are preferred since these materials make the frame light, easily cleaned, inexpensive to manufacture, and sufficiently strong for the intended purpose.

Various contemporary manufacturing techniques can be employed to produce the frame depending on the particular selection of materials including, but not limited to, such techniques as; theremo forming with or without vacuum assist using various theremoplastics such as ABS, impact polystyrene and the like; molding and blow molding with various polyolefins such as polypropelene, polyethylene and the like; and casting with various thermo setting resins such as fiber reinforced polyester and the like. An inexpensive and essentially disposable unit can be manufactured out of laminated foamed polystyrene similar to the contemporary fast food containers.

The frame can be conveniently sized to fit within the cage intended to confine the cat and be generally shaped to conform to the interior dimensions of arbitrary geometric shape.

As illustrated in FIGS. 2, 3, and 4, the raised plateau or shelf 26 and raised ridge 28 are displaced above top 20 while recesses 30, 32 (not shown), and 34 are displaced below top 20. Removable container 36 is inserted within recess 30 and removable mini-litter pan 40 is attached within recess 34 by velcro ® fasteners 42 and 44.

As illustrated in FIGS. 3 and 5, mini-litter pan 40 is equipped with a lip 46 which is removably attached to the top edge of mini-litter pan 40 by velcro ® fasteners 48 and 50. This removable lip 46, when assembled, extends inward and downward towards the interior of mini-litter pan 40 terminating at a level above the desired level of litter absorbent. Mini-litter pan 40 is further equipped with a urine sampling container 52 which rests within the mini-litter pan 40 and has sidewalls that extend at least to the level of litter absorbent and below the lip 46 such that the assemblage prevents scattering of litter and feces and simultaneously collects a urine sample.

In use, the feline platform is simply placed within the cage intended to confine the cat. The food and water bowls as well as the mini-litter pan, can then be readily removed and replaced without disturbing the cat. This is of particular importance when attending to the needs of a convalescent cat in that the patient need not be disturbed. The raised plateau allows for a comfortable shelf on which the patient can recline and further aids in maintaining a clean environment conducive to good health and rapid recovery. The urine sampler aids in monitoring the health and recovery of the feline patient and can also be a valuable aid during confinement for scientific or medical research and experimentation. Thus, the present invention involves an apparatus that optimizes the total care for hospitalized feline patients free of newspaper print ink exposure, spilled food and water, and excrement. The apparatus gives the patient more room and freedom in the cage while simultaneously allowing for convenient feeding and watering as well as ease of urine sampling. The use of plastics provides for a warm environment easily cleaned and maintained. Thus, the invention as described fulfills all of the objects initially set forth. It provides a cage platform for a domestic cat which affords improved means for keeping the cat clean, warm, watered and fed while simultaneously providing for monitoring its health by way of urine sampling.

While the invention has been described with a certain degree of particularity, it is manifest that many changes can be made within the details of construction and the arrangement of the components without departing from the spirit and scope of this disclosure. The fasteners employed to removably hold the assembled mini-litter pan and lip can be any of the well known means readily molded or fabricated into plastic devices such as snaps, locks, latches, frictional and contact closures, and the like. Therefore, it is to be understood that the invention is not limited to the embodiments set forth herein for purposes of exemplification, but is to be limited only by the scope of the attached claims, including a full range of equivalence to which each element thereof is entitled.

I claim:

1. A platform for supporting a confined domestic cat comprising:
    (a) a frame having a top with downwardly depending sidewalls structure circumferentially attached to the periphery of said top with said sidewall structure terminating at a lower edge forming a base to support the frame;
    (b) said top having a portion dimensioned to allow said cat to rest thereupon;
    (c) recess means in said top for holding, below said top, removable food and water bowls and an open-topped litter pan which is available for use by the said cat;
    (d) said litter pan removably fastened to said recess means and further including therein a urine sample receptacle comprising an open-top, closed-bottom container dimensioned to rest within said litter pan having sidewalls that extend above the desired level of litter and below the top of said litter pan; and
    (e) means to prevent scattering of said litter including a removably fastened top lip which extends inward and downward into the interior of said litter pan terminating above the top of said urine sample container.

2. A platform of claim 1 wherein said portion to receive said cat is a raised portion of said top.

3. A platform of claim 2 further comprising an integral raised lip around periphery of said top.

4. A platform of claim 1 wherein said mini-litter pan is fastened to said recess means in said top for holding said mini-litter pan by a velcro ® fastener.

* * * * *